(12) United States Patent
Hannebauer et al.

(10) Patent No.: US 6,715,982 B2
(45) Date of Patent: Apr. 6, 2004

(54) LATH PLACER

(76) Inventors: James B. Hannebauer, 3800 - 65th St. NW., Salmon Arm, British Columbia (CA), V1E 3A8; Robert B. Van Varseveld, 3181 - 28th St. NE., Salmon Arm, British Columbia (CA), V1E 3K8

( * ) Notice: Subject to any disclaimer, the term of this patent is extended or adjusted under 35 U.S.C. 154(b) by 141 days.

(21) Appl. No.: 10/156,665

(22) Filed: May 29, 2002

(65) Prior Publication Data
US 2003/0223846 A1 Dec. 4, 2003

(51) Int. Cl.[7] .............................................. B65G 57/18
(52) U.S. Cl. ..................... 414/789.5; 414/797; 414/802
(58) Field of Search .............................. 414/789.5, 797, 414/802

(56) References Cited

U.S. PATENT DOCUMENTS

| | | | | |
|---|---|---|---|---|
| 3,643,621 A | * | 2/1972 | Newnes | 414/798.1 |
| 3,904,044 A | * | 9/1975 | Lunden | 414/789.5 |
| 4,264,253 A | * | 4/1981 | Kennison | 414/789.5 |
| 4,720,227 A | * | 1/1988 | Eberle | 414/788.4 |
| 5,244,341 A | * | 9/1993 | Dion et al. | 414/789.5 |
| 5,636,965 A | * | 6/1997 | Newnes et al. | 414/789.5 |
| 5,863,176 A | * | 1/1999 | Newnes et al. | 414/789.5 |
| 6,065,927 A | * | 5/2000 | Baron et al. | 414/789.5 |
| 6,439,829 B1 | * | 8/2002 | Johnson | 414/789.5 |
| 6,655,902 B2 | * | 12/2003 | Dubé et al. | 414/789.5 |

* cited by examiner

Primary Examiner—Thomas J. Brahan
(74) Attorney, Agent, or Firm—Oyen Wiggs Green & Mutala

(57) ABSTRACT

A lath placer places pairs of lath segments to overlap in a package of lumber. The lath placer has at least one section which includes a pair of back-to-back lath segment placers. Each lath segment placer has a magazine and lath picker which picks lath segments from a top of the magazine. The lath segments are dropped down guide chutes onto lath gates which release the lath segments onto the package of lumber.

28 Claims, 8 Drawing Sheets

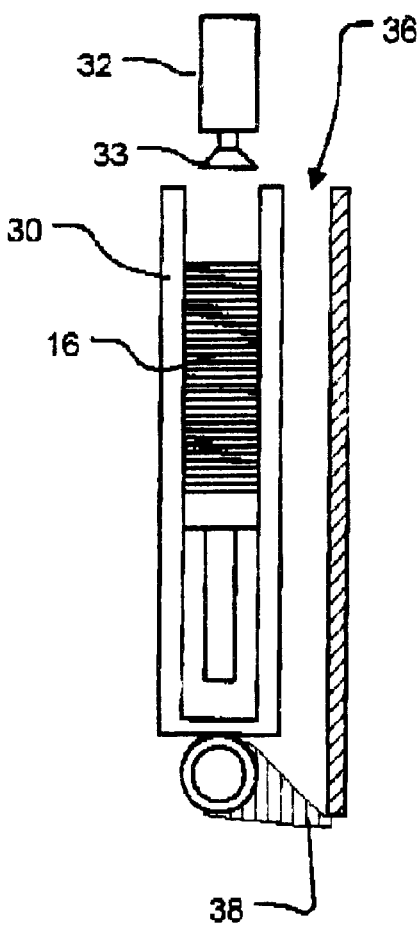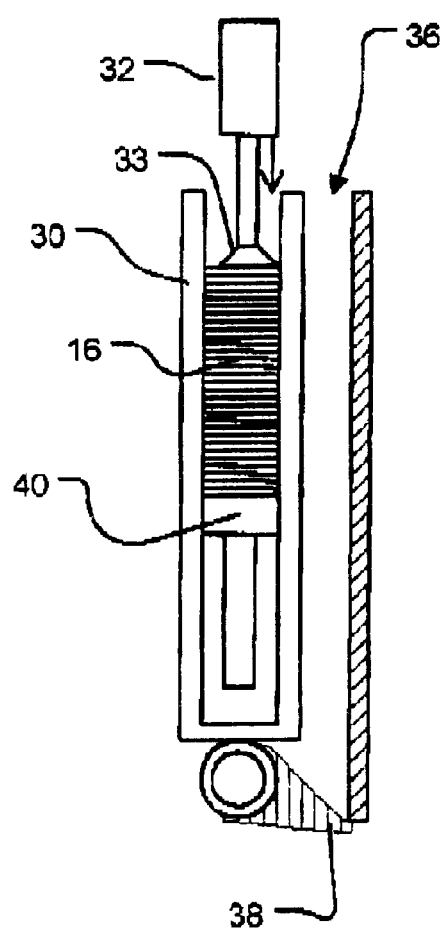
FIGURE 4A  FIGURE 4B

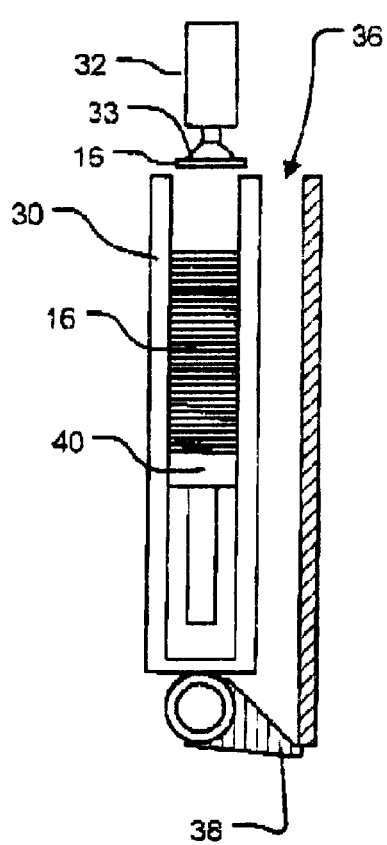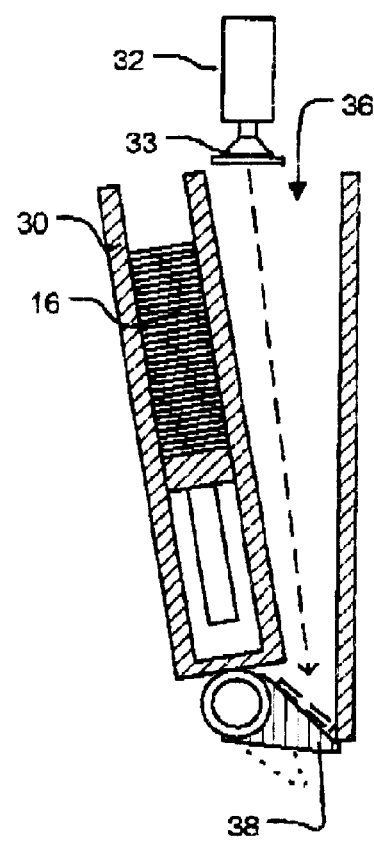
FIGURE 4C     FIGURE 4D

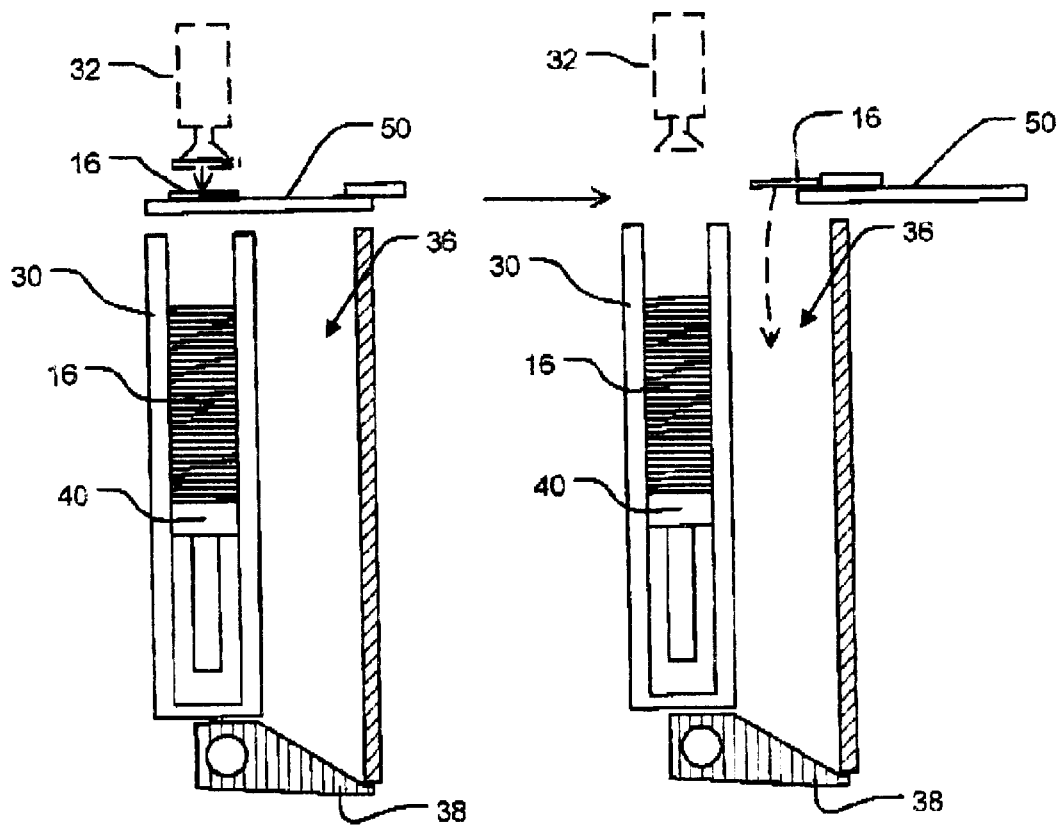
FIGURE 7A    FIGURE 7B

LATH PLACER

TECHNICAL FIELD

This invention relates to machines for placing laths in packages of lumber.

BACKGROUND

Finished lumber is typically shipped from sawmills in packages. All lumber in a package is typically of the same thickness, width, length and quality. A typical package may be 2½ feet tall, approximately 3½ to 4½ feet wide and 6 to 20 feet long. Such a package could comprise, for example, 20 layers of 1.5 inch thick lumber with, for example, 12, 13 or 14 pieces of 3½ inch wide lumber per layer. A single mill may produce packages having different widths, depending upon the requirements of the mill's customers. Packages of lumber are assembled by hand or with stacking machines. There are a number of different types of stacking machines in current use.

In order to preserve the integrity of a package of lumber during and after shipment, laths are typically placed transversely in the package. Laths may be placed transversely, for example, after every seven to ten layers of the package. The laths are thin strips of material that extend transversely across the package. Thin strips of wood are typically used for laths. Cardboard and other materials are sometimes used for laths. Each set of laths in a package may comprise, for example, three laths, one in the middle of the package and one near each end of the package.

After the package has been assembled, the package is typically strapped together with plastic or metal straps which extend around the package near the laths. The straps which hold a package of lumber together are typically tight. It has been found that these straps can warp the lumber if they are not aligned over the locations at which the laths are placed in the package. Finally, the package may be wrapped with a plastic wrap to protect the lumber during shipment.

Stacking machines are typically designed to handle laths of a length which is equal to the greatest width of packages to be assembled. When the stacking machine is assembling packages which are narrower than this maximum width, then the laths typically end up projecting out from at least one side of a package. The projecting lath ends prevent placement of the straps exactly in line with the laths. Before the package can be wrapped an operator typically breaks off the projecting ends of the laths.

A customer of the assignee of this invention recently proposed that, instead of placing a single lath across the width of a package the same objective could be realized by providing two shorter lath segments which overlap in the middle of the package. Ends of the lath segments could be aligned with outside edges of the package. Packages of different widths could be accommodated in this system by varying the degree of overlap of the lath segments. A strap could be wrapped around the package directly over the lath segments.

There were no existing lath placing machines capable of placing pairs of overlapping lath segments at spaced-apart locations along a package. There is a need for such machines.

SUMMARY OF THE INVENTION

This invention provides a lath placing machine. One aspect of the invention provides a lath placer comprising at least one lath placement section, the lath placement section comprising first and second lath segment placers. Each of the first and second lath placers comprise: a magazine capable of holding a plurality of laths; and, a lath picker operative to pick an uppermost lath from the magazine and drop the lath down a guide chute. The first and second lath segment placers are oriented transversely, and are movable relative to one another in a transverse direction.

In some embodiments the guide chutes of both of the first and second lath segment placers are between the magazines of the first and second lath segment placers. The magazine may be movable between a first position wherein an uppermost lath in the magazine is in line with the lath picker and a second position wherein a side of the magazine defines an edge of the guide chute and the lath picker is over the guide chute.

In some embodiments the first lath segment placer is be fixed in a transverse direction relative to a lumber stacker while the second lath segment placer is transversely movable relative to the lumber stacker. In some embodiments, the first and second lath segment placers are movable longitudinally relative to the lumber stacker.

Preferably each of the first and second lath segment placers comprises a lath gate at a lower end of the guide chute and the lath segment placer comprises a control system configured to open the lath gate to deposit a lath on a package of lumber.

In some embodiments of the invention, the first and second lath segment placers are oriented at a skew angle $\Phi$ to a perpendicular to a centerline of a lumber stacker. The skew angle may be less than 12 degrees in some such embodiments. For example, in certain embodiments the skew angle is in the range of 4 to 9 degrees.

Another aspect of the invention provides a lath placer comprising at least one lath placement section, the lath placement section comprises first and second lath segment placers. Each of the first and second lath placers comprises: a magazine capable of holding a plurality of laths; a lath picker operative to pick an uppermost lath from the magazine and drop the lath down a guide chute; and, a lath gate located at a lower end of the guide chute. The first and second lath segment placers are oriented transversely and overlap one another and the lath gates of the first and second lath placers are both located between the magazines of the first and second lath placers.

Another aspect of the invention provides a method for automatically placing one or more pairs of transversely overlapping lath segments on a package of lumber. The method comprises: providing a plurality of lath segments in each of first and second transversely oriented overlapping magazines; picking an uppermost lath segment from each of the first and second magazines; dropping the picked lath segments down corresponding first and second guide chutes onto corresponding first and second lath gates, the first and second lath gates being located between the first and second magazines; and, opening the first and second lath gates to allow the lath segments to fall onto a package of lumber.

Further aspects of the invention and features of lath placing machines and methods according to specific embodiments of the invention are described below.

BRIEF DESCRIPTION OF DRAWINGS

In drawings which illustrate non-limiting embodiments of the invention:

FIGS. 4A, 4B, 4C and 4D are schematic drawings illustrating configurations of a lath placing mechanism at selected points during the sequence of operations for placing a lath segment on a package;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
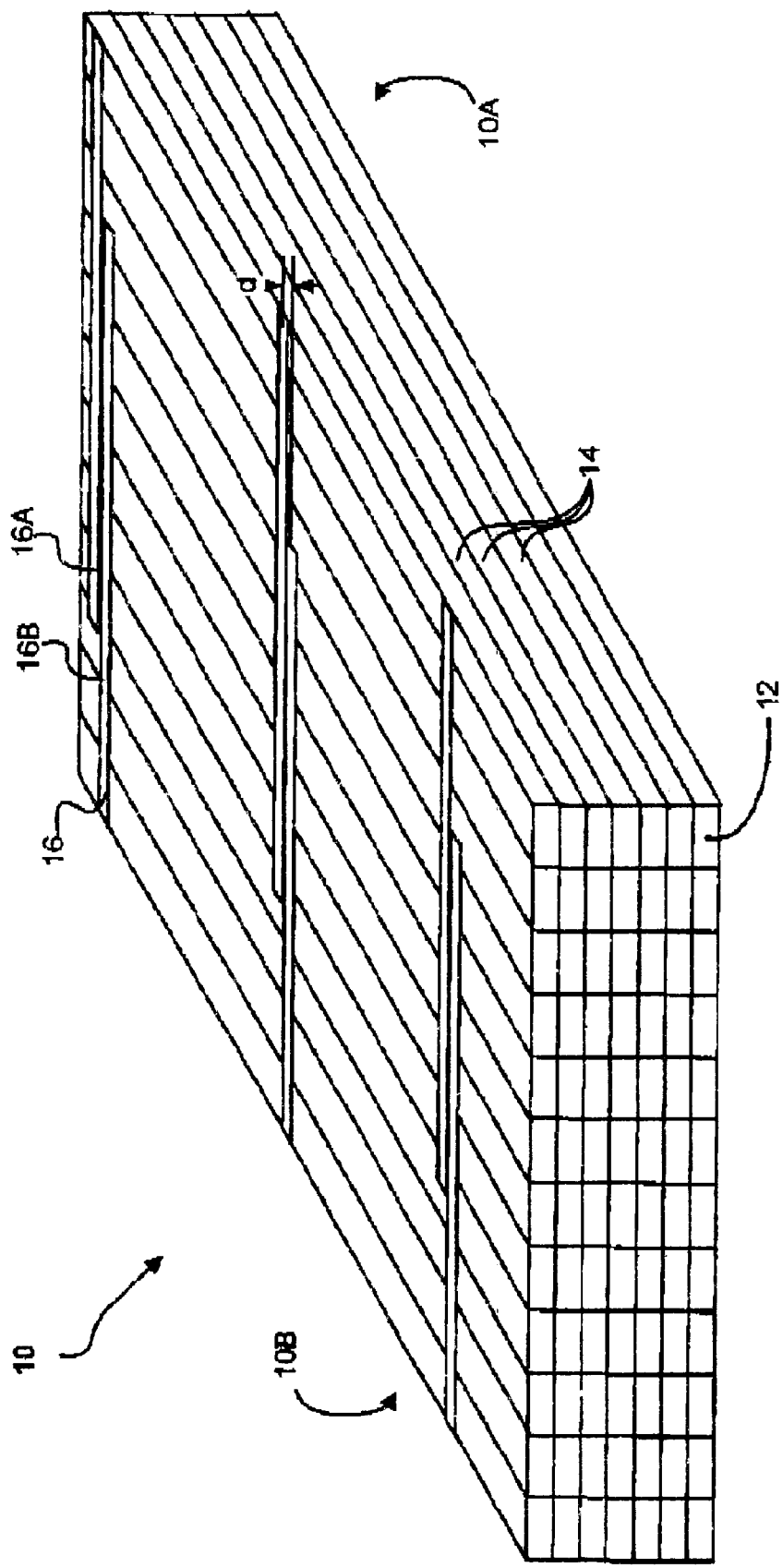
FIG. 1 is a isometric view of a partially completed package of lumber showing a number of spaced-apart pairs of overlapping lath segments.

This invention relates to a machine for placing overlapping lath segments in a package of lumber. A lath placing machine according to the invention may work in conjunction with a lumber stacker. The appended drawings illustrate the construction and operation of a lath placer according to the invention but are schematic in nature and are not to scale. FIG. 1 shows a partially completed package 10 of lumber 12. Package 10 comprises a number of layers 14, each comprising a row of pieces of lumber 12. Pairs of overlapping lath segments 16 are located at spaced-apart locations along the partial package 10. Each pair includes a lath segment 16A which extends transversely across the partial package 10 from a first side 10A and a lath segment 16B which extends transversely across partial packet 10 from a second side 10B.

Further layers of lumber 12 may be placed atop lath segments 16 to complete partial package 10. Subsequently, straps (not shown) may be wrapped around package 10 to hold package 10 together and a wrap may be placed over top of package 10 to protect lumber 12 during storage and transportation. The straps may be placed directly over lath segments 16.

Each pair of lath segments 16 is separated by a distance d. In general, it is desirable to maintain distance d fairly small. For example, it may be desirable for distance D to be in the range of the about one to eight inches. Lath segments 16 are typically in the range of approximately one to three inches wide and are relatively thin, for example, lath segment 16 may have thicknesses in the range of about 0.1 inch to 0.3 inches, although the invention is not limited to dealing with laths having these dimensions. Each lath segment 16 has a length which is less than a width of the narrowest packages 10 to be assembled, but longer than one half of the width of the widest packages 10 to be assembled.

Figure 2A:
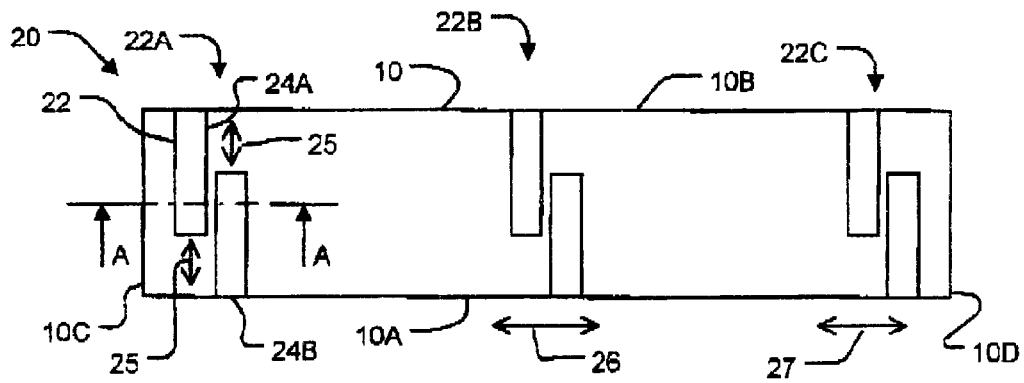
FIG. 2A is a top plan view of a lath placing machine according to one embodiment of the invention.

FIG. 2A is a schematic top view of a lath placing machine 20 according to the invention. Machine 20 has one or more sections 22. Each section 22 comprises a pair of lath segment placers 24A and 24B (collectively lath segment placers 24). Lath segment placers 24 are oriented transversely to partial package 10. In the embodiment of the invention illustrated in FIG. 2A, there are three sections 22A, 22B and 22C. Section 22A is at a fixed location near a first end 10C of partial package 10. Sections 22B and 22C are movable longitudinally along tracks (not shown in FIG. 2) to desired positions along the partial package 10. Packages of different lengths may be accommodated by moving sections 22B and 22C to longitudinal positions appropriate to the length of package being assembled, as indicated by arrows 26 and 27. Typically section 22B will be moved to a position in the center of partial package 10 while section 22C will be moved toward a location near a second end 10D of partial packet 10.

At least one of lath segment placers 24A and 24B of each section 22 is movable transversely relative to the other one of lath segment placers 24A and 24B to accommodate packages of different widths. In some embodiments, both lath segment placers 24A and 24B may be movable transversely relative to package 10 as indicated by arrows 25. Typically, however, a stacking machine makes one edge of package 10 in the same location independent of the width of package 10. In such cases the lath segment placers on the side of the fixed location edge of package 10 does not need to be movable.

Figure 3:
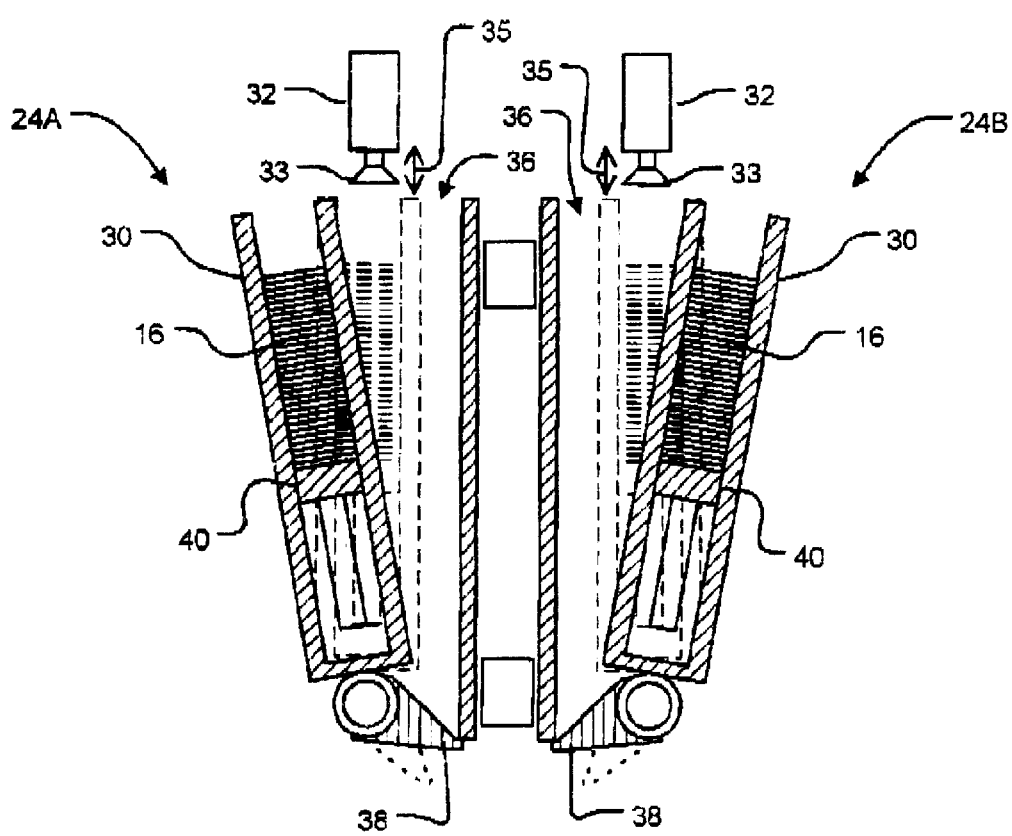
FIG. 3 is a section through a lath placing mechanism according to the invention capable of placing two overlapping lath segments.

FIG. 3 shows a section on the line A—A of FIG. 2A through one section 22. Each lath segment placer 24 comprises a magazine 30 capable of holding a number of lath segments. Magazine 30 is pivotally mounted and is movable between a first position shown in solid lines and a second position shown in dashed outline by way of a suitable actuator (not shown). A lath picker 32 is located above magazine 30. Lath picker 32 includes a vacuum pick-up 33 which is movable up and down as indicated by arrow 35. A guide chute 36 is located below lath picker 32. A lath gate 38 is located at a lower end of guide chute 36. A lift mechanism 40 is provided to elevate lath segments 16 in magazine 30.

Each lath segment placer 24 operates as shown in FIGS. 4A through 4D. As shown in FIG. 4A, to ready a lath segment 16 for placement, magazine 30 is pivoted to a position wherein the uppermost lath segment 16 in magazine 30 is below picker 32. Next, as shown in FIG. 4B, picker 32 is extended into magazine 30. Lift mechanism 40 may be operated to ensure that the uppermost lath 16 is against vacuum pick-up 33.

Lath picker 32 then lifts the uppermost lath segment 16 clear of magazine 30, as shown in FIG. 4C. Magazine 30 is then swung away from picker 32, as shown in FIG. 4D. When lath segment 16 is above guide chute 36, the vacuum holding lath segment 16 against vacuum pick-up 33 is released, thereby dropping lath segment 16 down through guide chute 36. In the illustrated embodiment, lath segment 16 falls through guide chute 36 onto a lath gate 38. The lath segment 16 is held on lath gate 38 until it is desired to place the lath segment 16. Preferably the transverse position of the lath segment 16 is adjusted while the lath segment is on lath gate 38. This adjustment may be performed by operating a tamper mechanism. The tamper mechanism registers one end of the lath segment 16 against a stop. The stop may be positioned to coincide with an edge of package 10 or a transverse location slightly inside one edge of package 10. Where a lath placer section comprises two lath segment placers, as shown in FIG. 2A, then the lath segments 16 may be both tamped outwardly before they are placed so that their outermost ends align in a desired manner with respective edges of the package.

When it is desired to place a lath segment 16 lath gate 38 is opened, as shown in dashed outline, to drop lath segment 16 onto the top of partial package 10. the lath segment placers 24 of a section 22 may operate simultaneously to place a pair of overlapping lath segments 16.

It can be appreciated that since lath segment placers 24 are located back-to-back, they can deposit lath segments 16 with a narrow spacing d. Lath segment placers 24 need to be spaced apart only far enough to permit them to be moved transversely relative to one another.

Figure 5A:
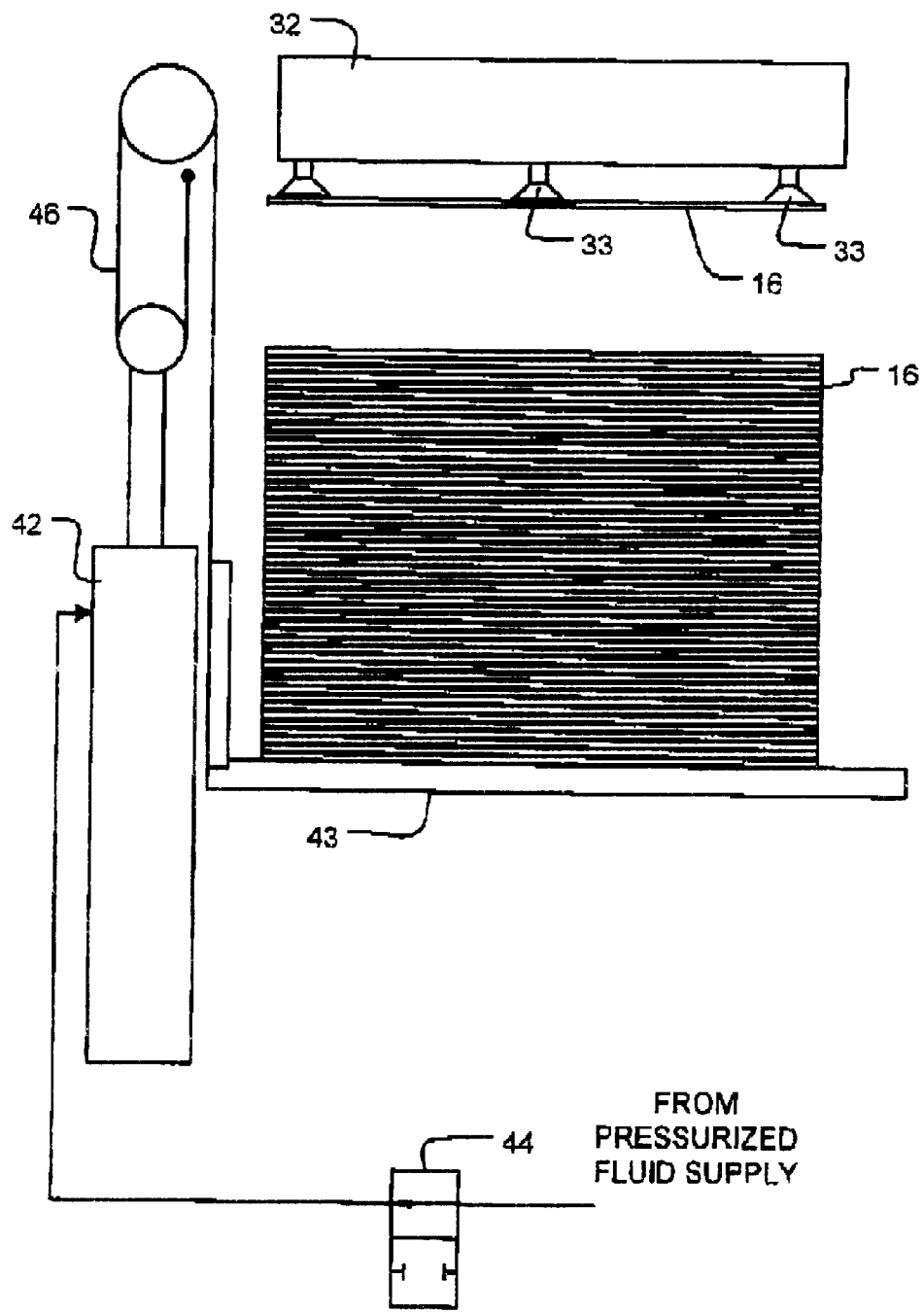
FIG. 5A illustrates a possible structure for a lath segment lift mechanism.

As shown in FIG. 5A, lath segment lift mechanism 40 may comprise a cylinder 42 coupled to a lift platform 43 located under lath segments 16 in magazine 30. Cylinder 42 is energized by operating a valve 44 which connects cylinder 42 to a source of pressurized fluid. In preferred embodiments the source of pressurized fluid comprises an air-over-oil pressure source. With this system it is not necessary to provide a sophisticated control system to detect when the uppermost lath segment 16 is against vacuum pickups 33. All that is necessary is to apply pressure by way of cylinder 42 which is sufficient to lift lath segments 16 upward against vacuum pickups 33. Valve 44 can then be closed. The fluid in cylinder 42 then continues to support lath 16 within magazine 30. Cylinder 42 may be double-acting cylinder which can be operated to move platform 43 downwardly in order to refill magazine 30 with lath segments 16. In the illustrated embodiment, cylinder 42 is coupled to platform 43 by way of a chain 46. Cylinder 42 is retracted to lift platform 43.

Figure 5B:
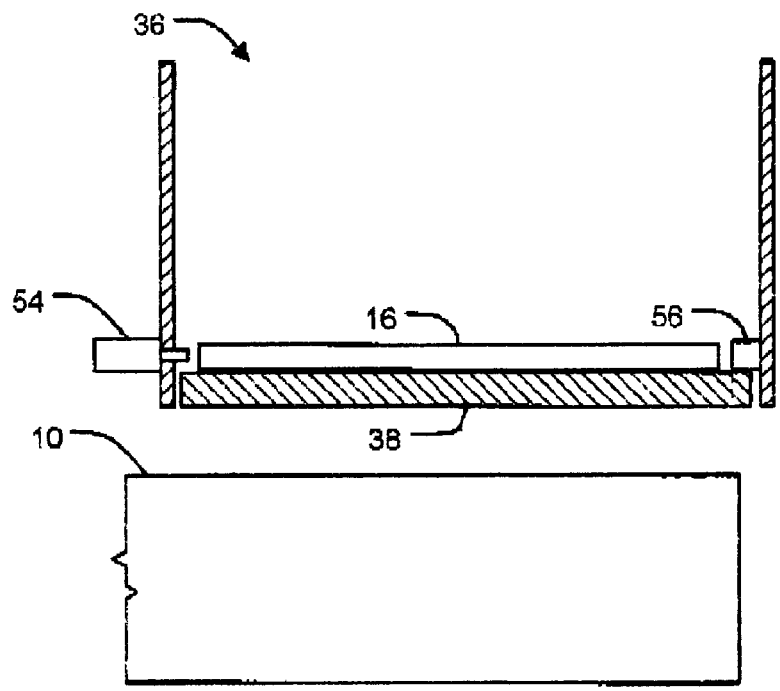
FIG. 5B illustrates a possible structure for a lath segment tamper mechanism.

FIG. 5B illustrates a possible configuration for a tamper mechanism. The tamper mechanism comprises an actuator 54 located near a first end of lath gate 38 and a stop surface 56 located near a second end of lath gate 38. Stop surface 56 is at a transverse position which aligns in a desired manner with an edge of package 10. After a lath segment 16 falls onto lath gate 38 actuator 54 is operated to push against one end of lath segment 16 and thereby urge an opposite end of lath segment 16 into contact with stop surface 56. When lath gate 38 is subsequently opened, lath segment 16 drops onto package 10 in proper alignment with package 10. Actuators 54 may be adjacent medial (or "inside") ends of lath gates 38 and stop surfaces 56 may be adjacent distal (or "outside") ends of lath gates 38.

A control system (not shown) controls the operation of lath placer 20. Suitable controls systems are well known to those skilled in the art of designing lumber handling equipment.

Figure 2B:
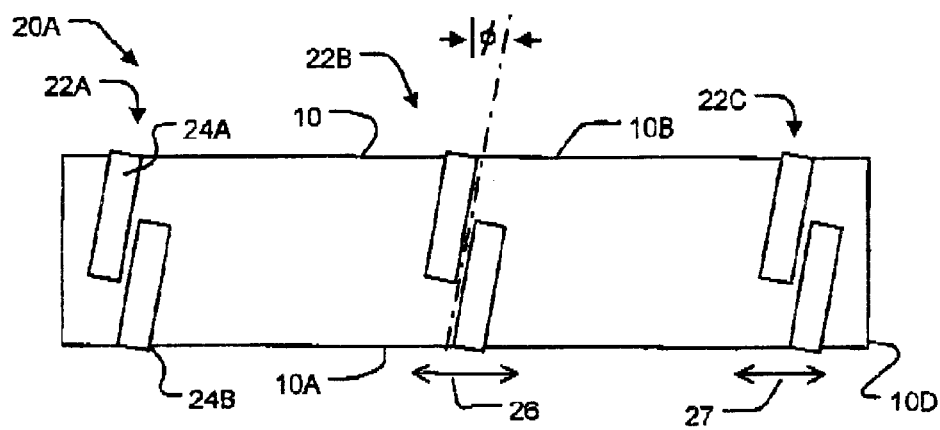
FIG. 2B is a top plan view of a lath placing machine according to another embodiment of the invention in which lath segment placers are skewed relative to the package.

As will be apparent to those skilled in the art in the light of the foregoing disclosure, many alterations and modifications are possible in the practice of this invention without departing from the spirit or scope thereof. For example:

While the embodiments described above have three sections, a lath placing machine according to the invention may comprise one, two, or more than three sections;

As shown in FIG. 2B, lath segments 16 are not necessarily placed perpendicular to a longitudinal centerline of the package. Lath segment placers 24 may be oriented at an angle Φ to the perpendicular to a longitudinal centerline of the package (i.e. they may be "skewed"). The skew angle Φ may be, for example in the range of 0 to 15 degrees and is preferably in the range of about 4 to about 10 degrees. Placing lath segments 16 so that they are skewed has the advantage that a strap can be wrapped around the package in a manner such that it crosses over both lath segments 16 of a pair of lath segments 16.

Figure 2C:
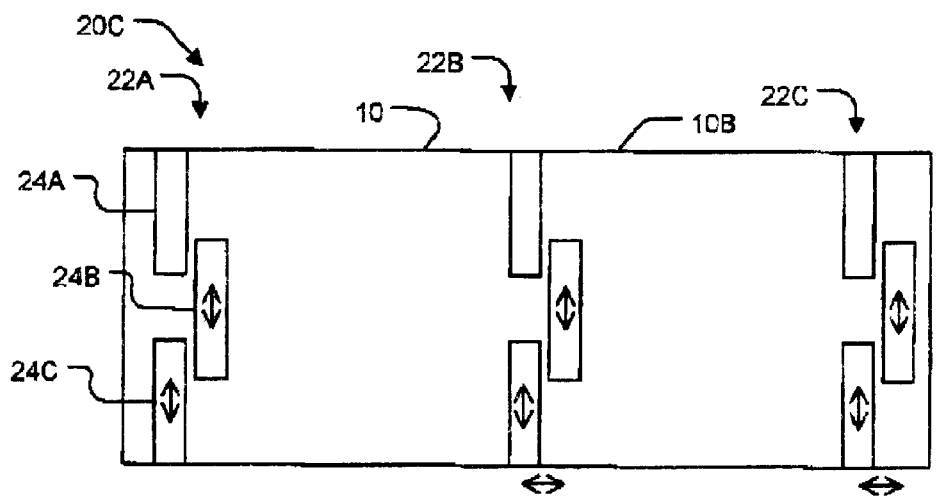
FIG. 2C is a top plan view of a lath placing machine according to another embodiment of the invention in which there are three lath segment placers in each section.

As shown in FIG. 2C, sections 22 could comprise more than two lath segment placers. FIG. 2C illustrates a lath placer 20B in which each section 22 has three lath segment placers 24 (24A, 24B and 24C). At least two of the three lath segment placers 24 are movable transversely relative to one another and relative to the third lath segment placer 24.

Figure 6:
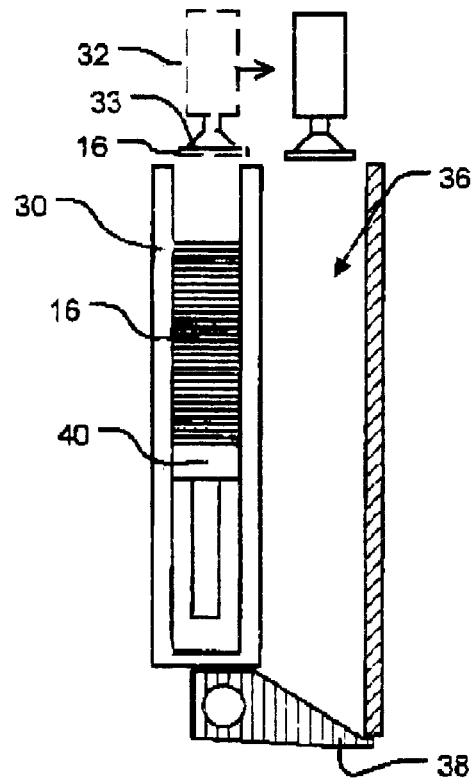
FIG. 6 illustrates a lath segment placer according to an alternative embodiment of the invention; and, FIGS. 7A and 7B illustrate a lath segment placer according to a further alternative embodiment of the invention.

In the embodiment described above, lath picker 32 only needs to move vacuum pickup 33 up and down while magazine 30 pivots between a position in which a lath segment 16 is presented to lath picker 32 and a position in which a lath segment 16 being held by lath picker 32 can be dropped down guide chute 36. In an alternative construction shown in FIG. 6, magazine 30 is fixed and lath picker 32 is movable longitudinally relative to a package 10. With this alternative construction, lath picker is positioned longitudinally over magazine 30 (as shown in dashed outline), picks up a lath segment 16, moves longitudinally to a position over guide chute 36 (shown in solid outline) and drops lath segment 16 down guide chute 36.

In a further alternative embodiment of the invention shown in FIGS. 7A and 7B, magazine 30 is fixed and a movable intermediate or "transfer" member 50 is provided between lath picker 32 and magazine 30. In this alternative embodiment of the invention, lath picker 32 picks up a lath segment 16, the movable intermediate member 50 is moved to below lath picker 32, lath picker 32 releases the lath segment 16 which falls onto the movable intermediate member 50, and the movable intermediate member 50 is retracted. While the movable intermediate member is being retracted, or after the movable intermediate member has been retracted, the lath segment 16 is dropped into guide chute 36.

Accordingly, the scope of the invention is to be construed in accordance with the substance defined by the following claims.

What is claimed is:

1. A lath placer comprising at least one lath placement section, the lath placement section comprising first and second lath segment placers, each of the first and second lath placers comprising:

a magazine capable of holding a plurality of laths; and, a lath picker operative to pick an uppermost lath from the magazine and drop the lath down a guide chute;

wherein the first and second lath segment placers are oriented transversely, and are movable relative to one another in a transverse direction.

2. A lath placer according to claim 1 wherein the guide chutes of both of the first and second lath segment placers are between the magazines of the first and second lath segment placers.

3. A lath placer according to claim 1 wherein the magazine is movable between a first position wherein an uppermost lath in the magazine is in line with the lath picker and a second position wherein a side of the magazine defines an edge of the guide chute and the lath picker is over the guide chute.

4. A lath placer according to claim 1 wherein the first lath segment placer is fixed in a transverse direction relative to a lumber stacker and the second lath segment placer is transversely movable relative to the lumber stacker.

5. A lath placer according to claim 4 wherein the first and second lath segment placers are movable longitudinally relative to the lumber stacker.

6. A lath placer according to claim 1 wherein each of the first and second lath segment placers comprises a lath gate at a lower end of the guide chute wherein the lath segment placer comprises a control system configured to open the lath gate to deposit a lath on a package of lumber.

7. A lath placer according to claim 6 wherein each of the first and second lath placers comprises a tamper mechanism adjacent the lath gate, the tamper mechanism configured to position an end of a lath segment on the lath gate in a predetermined transverse position relative to an edge of a package.

8. A lath placer according to claim 7 wherein the tamper mechanism comprises an actuator located to push on one end of a lath segment on the lath gate and a stop surface located to abut an opposite end of the lath segment on the lath gate.

9. A lath placer according to claim 8 wherein the actuator is located adjacent a medial end of the lath gate and the stop surface is located adjacent a distal end of the lath gate.

10. A lath placer according to claim 1 wherein the first and second lath segment placers are oriented at a skew angle Φ to a perpendicular to a centerline of a package.

11. The lath placer of claim 10 wherein the skew angle is less than 12 degrees.

12. The lath placer of claim 10 wherein the skew angle is in the range of 4 to 9 degrees.

13. The lath placer according to claim 1 wherein the lath placement section comprises more than two segment placers.

14. A lath placer according to claim 1 wherein the lath picker is movable longitudinally between a first position over the magazine and a second position over the chute and the lath segment placer comprises a control system configured to move the lath picker from the first position to the second position and to release a lath from the lath picker while the lath picker is in the second position.

15. A lath placer according to claim 1 comprising a transfer member movable between a position below the lath picker and a position over the guide chute, the transfer member operative to carry lath segments picked up by the lath picker from the lath picker to the guide chute.

16. The lath placer of claim 1 wherein the lath placement section comprises three lath segment placers, the three lath segment placers including first and second lath segment placers located at edges of a package and oriented with their magazines on a first side of their guide chutes and a third lath segment placer oriented with its magazine on a second side of its guide chute, the third lath segment placer overlapping in the transverse direction with each of the first and second lath segment placers.

17. The lath placer according to claim 1 having two or three lath placement sections.

18. The lath placer according to claim 1 wherein the magazine of each of the lath segment placers comprises a lath segment lift mechanism configured to lift an uppermost lath in the magazine to a position accessible to the lath picker.

19. The lath picker of claim 18 wherein the lath segment lift mechanism comprises a platform actuated by a cylinder connected to a source of pressurized substantially non-compressible fluid by a valve.

20. A lath placer comprising at least one lath placement section, the lath placement section comprising first and second lath segment placers, each of the first and second lath placers comprising:

a magazine capable of holding a plurality of laths;

a lath picker operative to pick an uppermost lath from the magazine and drop the lath down a guide chute; and, a lath gate located at a lower end of the guide chute;

wherein the first and second lath segment placers are oriented transversely and overlap one another and the lath gates of the first and second lath placers are both located between the magazines of the first and second lath placers.

21. A method for automatically placing a pair of transversely overlapping lath segments on a package of lumber, the method comprising:

providing a plurality of lath segments in each of first and second transversely oriented overlapping magazines;

picking an uppermost lath segment from each of the first and second magazines;

dropping the picked lath segments down corresponding first and second guide chutes onto corresponding first and second lath gates, the first and second lath gates being located between the first and second magazines; and, opening the first and second lath gates to allow the lath segments to fall onto a package of lumber.

22. The method of claim 21 comprising tamping the dropped lath segments against stop surfaces while the dropped lath segments are on the first and second lath gates.

23. The method of claim 22 wherein the stop surfaces are adjacent outside ends of the first and second lath gates and tamping the dropped lath segments comprises moving the dropped lath segments outwardly.

24. The method of claim 22 wherein the lath segments fall onto the package of lumber at a skew angle relative to the package of lumber.

25. The method of claim 21 wherein dropping the picked lath segments down corresponding first and second guide chutes comprises pivoting the first and second magazines away from positions of the picked lath segments and then dropping the picked lath segments.

26. The method of claim 21 wherein picking the lath segments comprises lifting the picked lath segments with a vacuum pickup.

27. The method of claim 26 wherein dropping the picked lath segments down corresponding first and second guide chutes comprises moving the vacuum pickup from a position over the corresponding magazine to a position over the corresponding guide chute.

28. The method of claim 26 wherein dropping the picked lath segments down corresponding first and second guide chutes comprises placing a corresponding transfer member below the vacuum pickup, dropping the picked lath segment onto the transfer member, and carrying the picked lath segment to the guide chute on the transfer member.

* * * * *